INVENTOR.
KENJI MUTO
BY Eyre, Mann & Lucas

INVENTOR.
KENJI MUTO
BY Eyre, Mann & Lucas

INVENTOR.
KENJI MUTO
BY
Eyre, Mann & Lucas

INVENTOR.
KENJI MUTO
BY
Eyre, Mann & Lucas

DROP-OUTS COUNTER

Filed July 9, 1963 6 Sheets-Sheet 5

INVENTOR.
KENJI MUTO
BY
Eyre, Mann & Lucas

INVENTOR.
KENJI MUTO
BY
Eyre, Mann & Lucas

United States Patent Office 3,288,986
Patented Nov. 29, 1966

3,288,986
DROP-OUTS COUNTER

Kenji Muto, Setagaya-ku, Tokyo, Japan, assignor to Akai Electric Co., Ltd., Tokyo, Japan, a corporation of Japan Filed July 9, 1963, Ser. No. 293,735
6 Claims. (Cl. 235—92)

This invention relates to a unique drop-outs counter.

Considerable developments have recently been made in magnetic tape recording and playback machines (hereinafter shortly referred to as "tape recorders") in reducing the tape running speed. When a slower tape speed is employed, the tone quality will be considerably influenced adversely, should the tape represent "drop-outs." Causes of such drop-outs are attributable, among others, to particles of foreign matter embedded in the coating, droplets of magnetic material adhering to the true coating surface of the tape base, collapsed bubbles formed during coating, clumps on the coating surface and of unknown origin, pinholes in the coating, areas where anchorage of coating to base has failed, and base imperfections. When a drop-out is encountered, a decrease in signal level will be invited. Thus, if a magnetic tape should represent numerous drop-outs, the tone quality will be injured so far.

In order to determine quantitatively the frequency of drop-outs of the magnetic tape, a highly complicated mechanism must be used and a considerable length of time is consumed for this purpose according to the conventional technique. A machine employs a pen-and-ink recorder. Another machine incorporates an oscillograph.

It is therefore an object of the present invention to provide a unique drop-outs counter.

Another object is to provide a new and improved drop-outs counter incorporating a highly simplified transistor circuit as its electronic drop-outs sensing means.

A further object is to provide a drop-outs counter which is highly simple in its design, yet reliable and efficient in its operation and enough compact to be used as a portable instrument.

These and other objects of the invention will be more apparent to those skilled in the art from a consideration of the following detailed description when taken together with the accompanying drawings in which.

Figure 1:
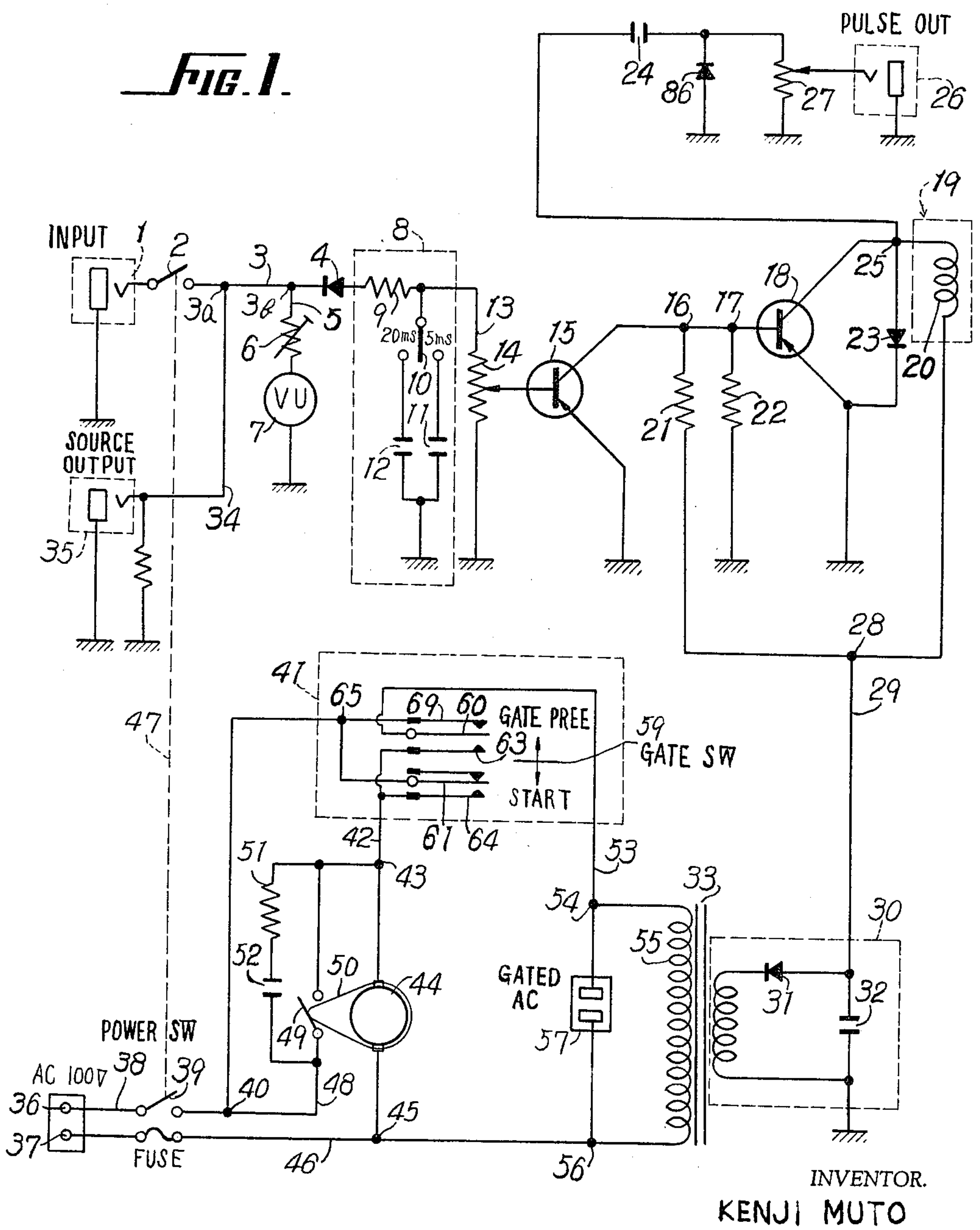
FIG. 1 is a circuit diagram showing electronic and electric parts employed in an embodiment of the invention.

Referring now to FIG. 1, an input jack 1 is electrically connected through a manual switch 2 and junction points *3a* and *3b* to a rectifier 4 by a lead 3. From junction *3b*, a branch lead 5 leads off to earth. As shown, the branch lead includes a rheostat 6, 30 kilohms, and a signal level indicator 7, preferably in the form of a volume unit meter. The negative side of rectifier 4 is electrically connected to a two-way time constant circuit 8 which includes a resistor 9, 100 ohms, a manual selector switch 10, and two parallel-connected capacitors 11–12, 25 and 100 microfarads, respectively. Output lead 13 from circuit 8 is led to earth through the intermediary of a rheostat 14, 300 ohms, the slider of which is electrically connected to the base of a first stage transistor 15. The rheostat 14 serves for a sensitivity adjuster of the instrument as will be more fully described hereinafter. The collector of the transistor is connected via junction points 16–17 to the base of a second stage transistor 18, the collector of which is in turn connected through a junction 25 to an electromagnetically operated digital counter 19 only schematically represented by a dotted block which includes a drive coil 20 as its main representative constituent. Emitters of the both transistors are connected to earth, yet that of the second transistor 18 is connected, on the other hand, through rectifier 23, junction 25, and a blocking condenser 24 to a pulse-outgoing jack 26 which serves, as will be described hereinafter, for supplying output signals to an oscillograph (not shown) when it is required to visually observe the signals as conventionally. In this circuit, a rectifier 86 and a resistor 27, 30 kilohms, are connected in parallel to earth as shown. Resistor 27 is used to adjust the signal level appearing on the oscillograph, while rectifier 86 is intended to protect the transistors from being damaged by unusual occasional voltages which may be reversely supplied from the oscillograph side. Resistor 21, 5 kokohms, is inserted between junctions 16 and 28, the latter being in a lead 29 electrically connecting the operating coil 20 with a D.C. source 30 (50 v.) which comprises the secondary winding of a power transformer 33, rectifier 31 and condenser 32, 500 microfarads, the latter serving for smoothing the ripples in the rectified current. Junction 17 is connected through resistor 22, 1 kilohm, to earth. Both resistors 21–22 are inserted as conventionally to adjust the working conditions of the both transistors 15 and 18.

Junction *3a* is connected through a lead 34 to a "SOURCE OUTPUT" jack 35 the purpose of which will be described hereinafter.

Power terminals 36 and 37 are arranged to be electrically connected to a power source, A.C. 100 volts, 50 cycles, not shown. From terminal 36, a lead 38 extends to a switching contact assembly 41, which lead includes, as shown, manual power switch 39 and junction 40. An output lead 42 from the assembly 41 returns through junction 43, Warren motor 44, junction 45 and return lead 46 to power terminal 37. As hinted by a dotted line 47, manual switches 2 and 39 are mechanically connected with each other for common actuation. A branch lead 48 includes a switch contact 49 and is connected between two junctions 40 and 42. When the machine is at rest, the switch contact is kept open as shown by virtue of a cam 50 kept in contact therewith. The cam is arranged coaxially with the shaft of the motor 44 which is designed to rotate at a speed of 1 r.p.m. when energized. Resistor 51, 100 ohms, and capacitor 52, .1 microfarad, are connected across the switch contact 49 for suppressing possible switching arcs.

Another output lead 53 is connected via junction 54 to one end of primary winding 55 of power transformer 33 and lead 46 extends further from junction 45 through junction 56 to the opposite end of the primary winding. Between junctions 54 and 56, there is inserted a plug socket 57 which is denoted by "GATED A.C."

The operation of the above described machine is as follows:

At first, a tape recorder 58 (FIG. 2) is operated for about 80 seconds so as to record a continuous 3 kc. signal on a magnetic tape (not shown) to be tested, after the recording signal level has been adjusted to −3 VU. Rewind the recorded length of the tape. Insert a speaker output plug (not shown) of the tape recorder in input jack 1. Manipulate switch 10 to the left in FIG. 1 (or to the upper position in FIG. 3) destined for 5 ms. drop-outs.

Figures 2, 11:
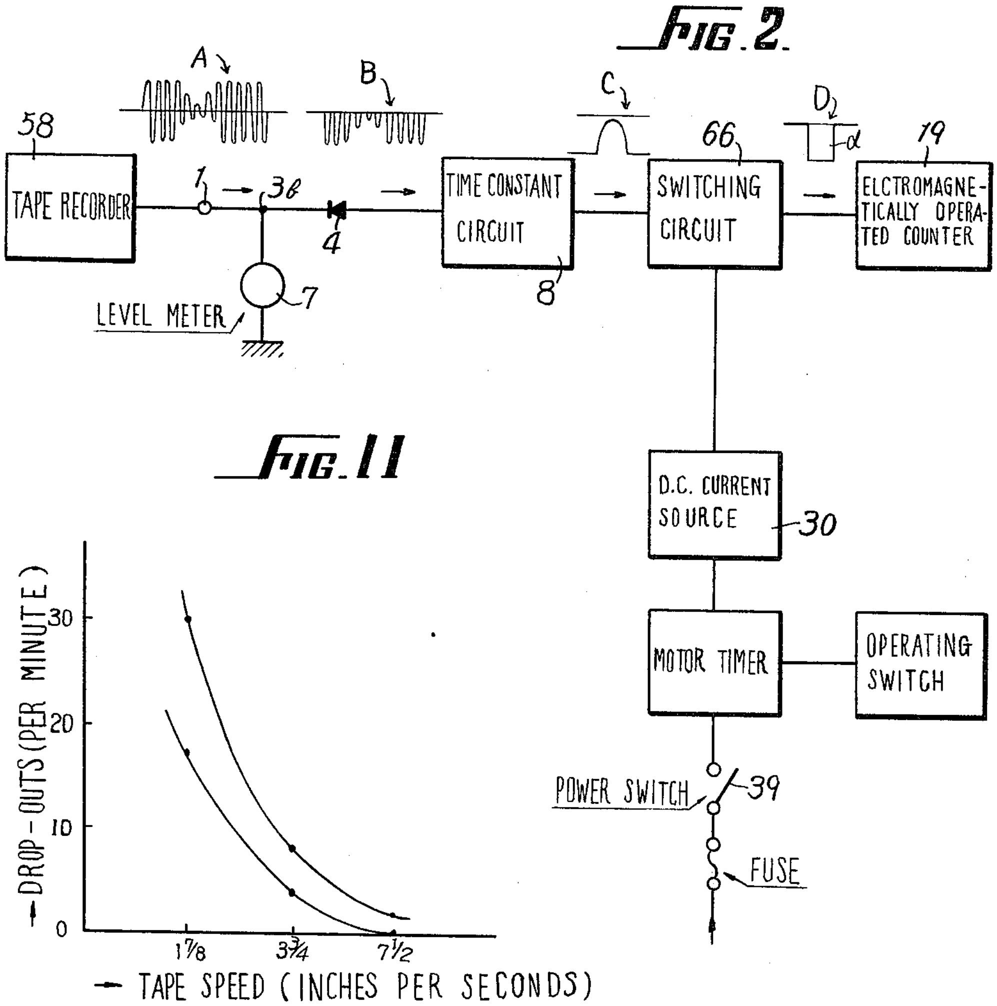
FIG. 2 is a simplified block diagram of FIG. 1, yet attached with a tape recorder shown in a block, illustrating especially wave forms at several preferred points in that figure.
FIG. 11 is a diagram showing the relation between number of drop-outs and running speed of a magnetic speed as determined by means of the drop-outs counter according to this invention.

Manipulate switches 2 and 39 commonly to on. Operate again the tape recorder to play back the recorded information. The output signal will then be indicated on the level meter 7 (FIGS. 1 and 2). Adjust rheostat 6 so as to fall the indicated signal upon zero mark of the meter. Push gate switch 59 of switch contact assembly 41 (see also FIG. 3) down to "START" position for about 2 or 3 seconds so as to bring switching members 60–62 into contact with lower stationary contacts 63 and 64, respectively, whereby motor 44 will be energized, because a power circuit including terminal 36, closed switch 39, junctions 40 and 65, contacts 61 and 64, junction 43, motor 44, junction 45 and terminal 37. After motor 44 and cam 50 have thus turned several degrees during the above specified short time period for provisional switch manipulation, cam operated switch 49 is closed by spring action (not shown) and thus, even when the operator has released his hand from manual switch 59, the motor may continue its rotation until it will have been deenergized. This de-energization will be brought into effect when the motor has performed a complete revolution and the cam operated switch is thereby forcibly opened again as shown. The rotational speed of the motor is designed for 1 r.p.m. as already mentioned so that the time interval required for a complete revolution of the motor and thus of the attached cam is just a minute. It will be clear from the foregoing that the cam operated switch and the motor constitute together a one minute timer. A modification of this motor timer will be described in detail hereinafter with reference to FIGS. 9–10.

On the other hand, the output signal current including a drop-out, as exemplarly represented A in FIG. 2, may be supplied from the tape recorder 58 through input jack 1 and junction 3*b* to rectifier 4. The rectified signal, illustrated by curve B, is then supplied to time constant circuit 8 and transformed into a smoother wave as denoted by C which is further supplied to switching circuit 66 comprising two-stage transistors 15 and 18. The supplied signal is subjected in this circuit to phase-reversing and D.C. amplifying so as to provide a drive current as denoted by D. A pulsing part of this drive current as denoted by *d* must represent a value corresponding to a drop-out equal to or larger than −3 db measured at the corresponding input signal level from the tape recorder and flows through the drive coil 20 of the counter, and it will be actuated in the manner as will be more fully described hereinbelow in connection with FIGS. 6–8.

Figures 5, 6, 7, 8:
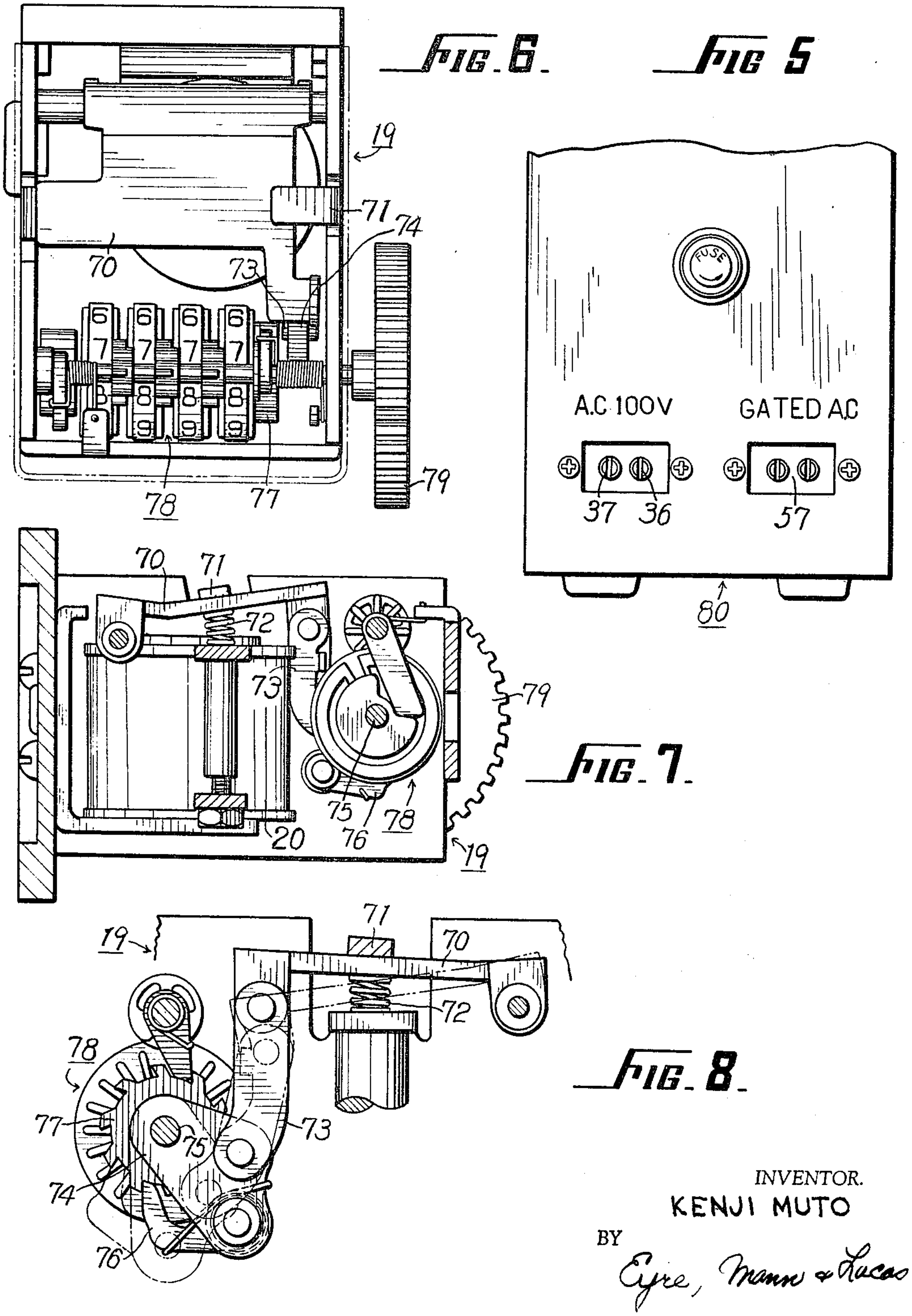
FIG. 5 is a rear side view of the counter, yet shown substantially lower half thereof.
FIG. 6 is a top plan view of a mechanical counter mechanism employed in the counter of this invention, wherein chain lines showing the casing cover.
FIG. 7 is an end view of the mechanism seen from left-hand side of FIG. 6.
FIG. 8 is a detail view of the ratchet mechanism employed in the counter mechanism shown in FIGS. 6–7.

When coil 20 is energized in the above-mentioned way, armature 70 normally kept in contact with a stationary stop 71 by means of a spring 72 is attracted towards the coil 20, whereby actuator lever 73 hinged at its one end to the armature and at its other end to a rocker 74 is advanced (refer to FIGS. 6–8). Rocker 74 is rotatably mounted on shaft 75 and provided at its one end with a spring-loaded pawl 76 kept in engagement with a ratchet wheel 77. Thus, when coil 20 is energized, ratchet wheel 77 is fed a step, whereby counting a drop-out. The count is transmitted to a conventional counting roll assembly 78. If a number of drop-outs should follow, similar counts will be equally carried out and registered. For resetting the counter, a reset wheel 79 is provided as usual.

When it is required to count 20 ms. drop-outs, manipulate switch 10 to the left in FIG. 1 (or downward in FIG. 3), so as to establish a circuit including capacitor 12. Other manipulations and operation of the machine are just same as described above. In this case, it will be clear 20 ms. drop-outs are counted instead of 5 ms. one.

On the other band, when it is required to count 5 and 20 ms. drop-outs simultaneously, two machines can be operated in parallel. For this purpose, connect a plug-in cable (not shown) between sockets 57 denoted "GATED A.C." of such two machines. A further plug-in cable (also not shown) is connected then between "SOURCE OUTPUT" jack 35 of the first machine and "INPUT" jack 1 of the second machine. Then, manipulate switch 10 of the first machine to "5 ms." and that of the second machine to "20 ms." In this way, both kinds of drop-out may be counted in a single operation. In this case, the motor timer of the second machine must be shut-off. For this purpose, switch 59 of the second machine is manipulated to its "GATE FREE" position. By this manipulation, movable contact 61 is insulated from stationary contact 64 so that the motor circuit WM is de-energized.

Figure 3:
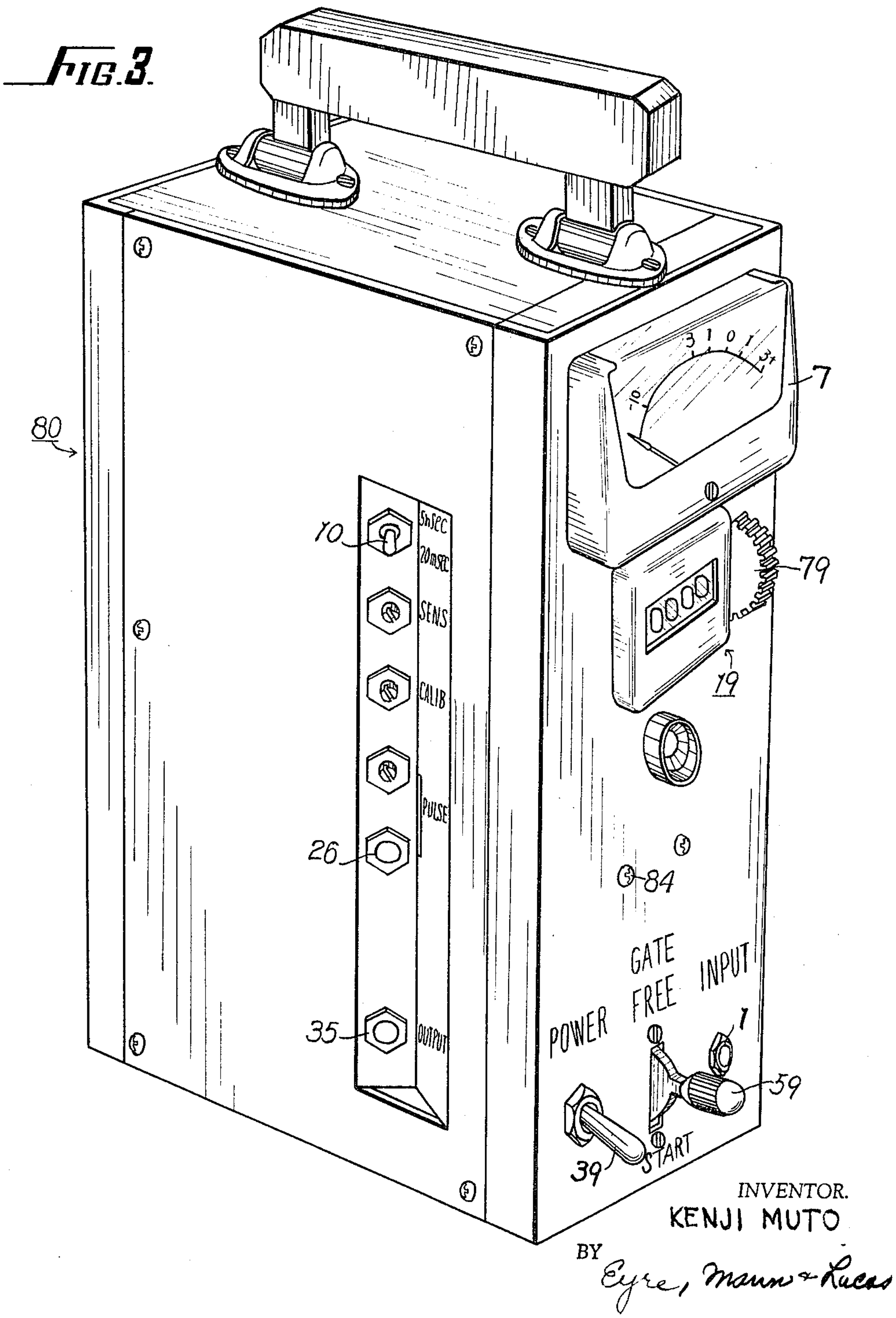
FIG. 3 is a perspective view of the counter.
Figure 4:
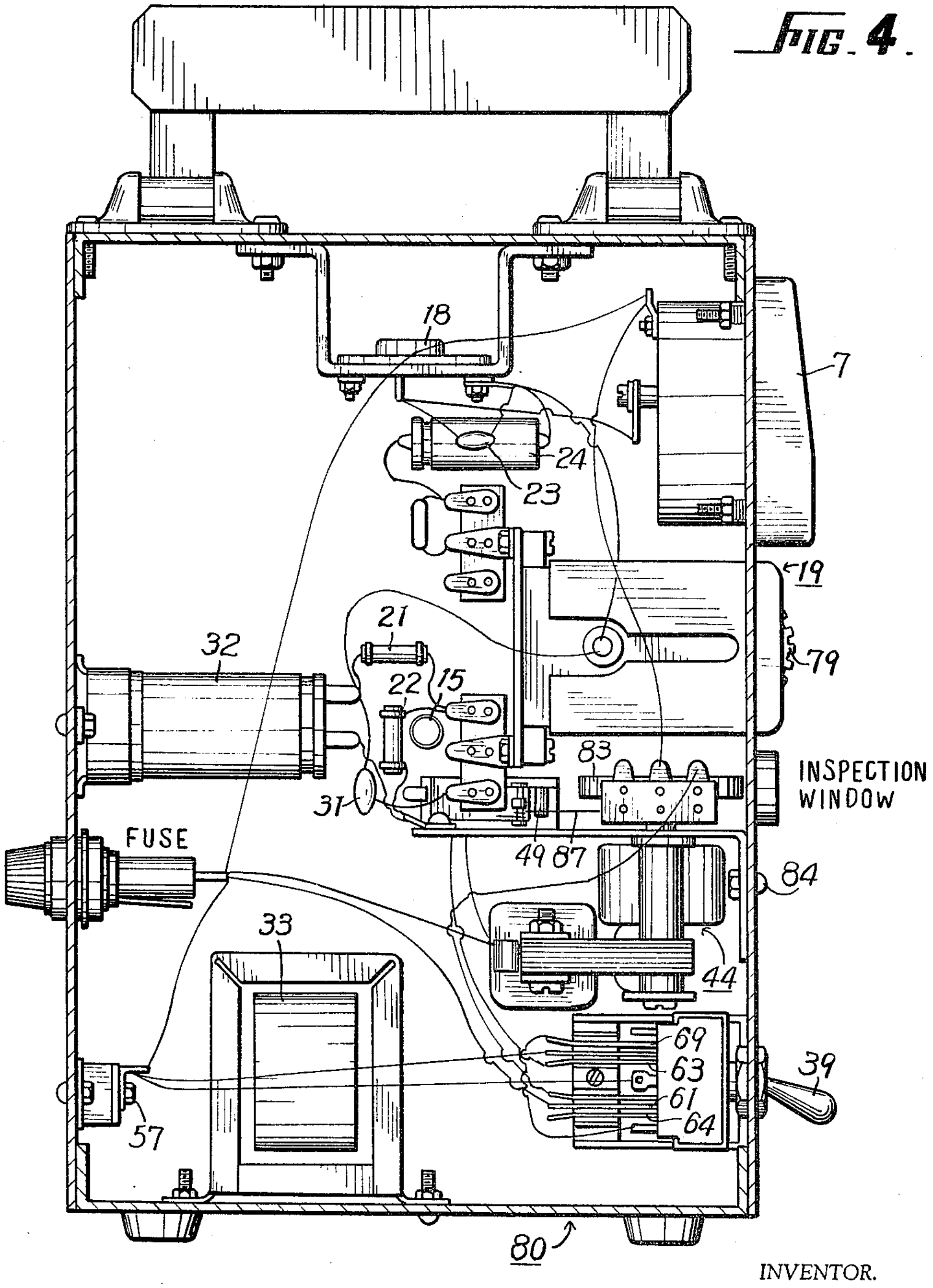
FIG. 4 is an inside view thereof with the side cover removed and the casing sectioned.

The above described components are encased in a handy housing 80 as shown in FIGS. 3–4. In these figures, same references used hereinbefore are attached so that the mechanical arrangement of the machine may be easily understood, in spite of that detail electrical connections and minor parts are omitted for simplicity of the drawings.

Figure 9:
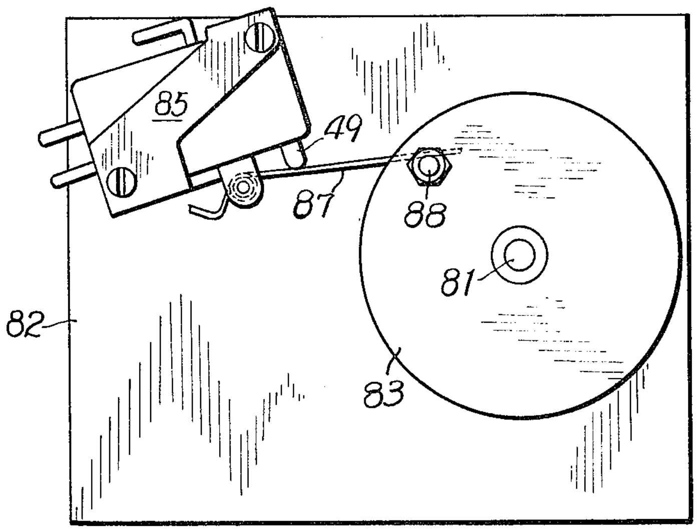
FIG. 9 is an enlarged and detail top plan view of the motor timer shown in FIG. 4.
Figure 10:
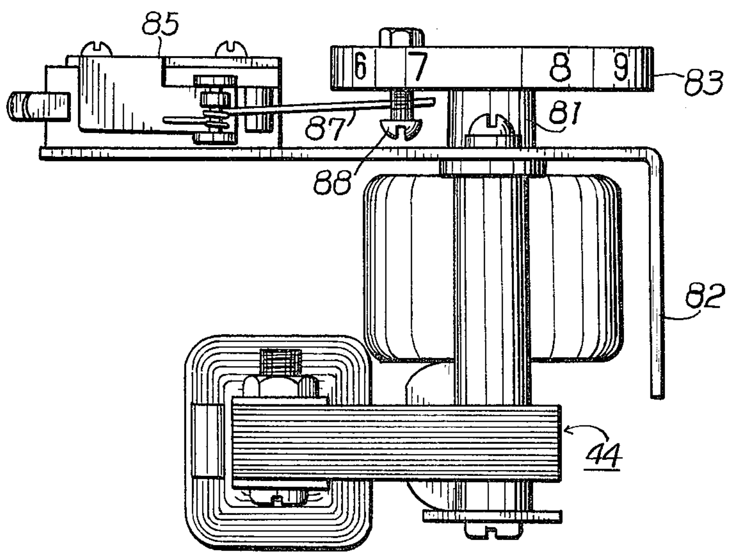
FIG. 10 is an elevation of the timer seen from the lower side of FIG. 9.

FIGS. 9–10 represents a somewhat modified cam arrangement from that shown in FIG. 1 by 50. Motor shaft 81 of motor 44 which is supported on a bracket 82 is attached fixedly at its one end with a disc 83. Bracket 82 is rigidly supported by means of fixing screws 84 (of which only one is seen in FIG. 4) on the housing 80 of the machine, and in turn mounts rigidly a microswitch 85 which is provided with a switching member 49 which was described hereinbefore in connection with FIG. 1. A spring 87 is attached at its one end fixedly to the microswitch casing and has its other end normally kept in contact with both switching member 49 and a stop 88 in the form of a screw mounted in the said disc 83. When the motor is at rest, switching member 49 is opened as already described. When the motor is rotated several degrees, the engagement between member 49 and spring 87 is released, and the switching member is brought into its closed position under the influence of a spring (not shown). It will be clear that upon a complete revolution of motor 44, stop 88 is again brought into engagement with spring 86, thus resiliently urging a small angle against the switching member 49, so that the latter is pushed in into its off-position.

FIG. 11 shows a graph showing number of 5 ms. drops-outs of a tape running at several different tape speeds, as measured each time for 60 seconds by means of the machine or instrument according to this invention. It will be observed that with slower tape running speed, more numerous drop-outs are encountered.

Figure 12:
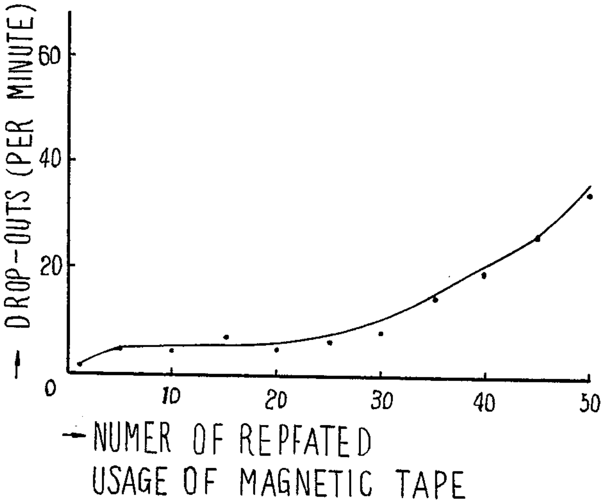
FIG. 12 is a diagram showing the relation between the number of drop-outs and the number of repeated use of a magnetic tape as measured by the counter according to the invention.

FIG. 12 shows tests on a same tape which has been repeatedly recorded and reproduced. As shown, the number of usage of the tape is increased, the number of encountered drop-outs will amazingly be increased.

It is recognized that, to those skilled in the art, there will be apparent various modifications and arrangements which may be made without departing from the spirit and scope of the principles entailed.

The invention is only to be limited by the appended claims.

I claim:

1. In a drop-outs counter for magnetic tape, a rectifier for converting a delivered A.C. signal having a scheduled constant level from a tape recorder into a corresponding D.C. signal, a transistored circuit electrically connected with said rectifier for subjecting said rectified signal to phase conversion and amplification, a timer electrically connected to said circuit for limiting the output therefrom for a predetermined time period such as a minute, and an electromagnetically operated counter having a drive coil and a digital type counter mechanism and means for initiating operation of said counter mechanism, upon energization of said coil by a pulsative output higher than a predetermined level from said circuit said level being determined as a function of a drop-out of a predetermined deviation and for a predetermined time period in said received signal.

2. Drop-outs counter as set forth in claim 1, comprising further an indicator for the indication of the level of the received signal.

3. Drop-outs counter as set forth in claim 1, comprising further a multiple way time constant circuit inserted between said rectifier and a first stage transistor of said transistored circuit for checking minor drop-outs having a shorter duration than predetermined.

4. Drop-outs counter as set forth in claim 1, wherein said timer comprises a slow speed motor designed for rotation for a predetermined time period such as one minute when once energized.

5. Drop-outs counter as set forth in claim 3, wherein said multiple ways are selectively connectable.

6. Drop-outs counter as set forth in claim 1, further comprising an adjustable signal level meter arranged in advance of said rectifier.

References Cited by the Examiner

UNITED STATES PATENTS

| | | | |
|---|---|---|---|
| 2,516,189 | 7/1950 | Dinsmore | 235—92 |
| 3,020,749 | 2/1962 | Cropper et al. | 235—92 |

MAYNARD R. WILBUR, *Primary Examiner.*

J. F. MILLER, *Assistant Examiner.*